June 29, 1965 L. C. SINDEL 3,191,651

COCONUT DEMEATING APPARATUS AND METHOD

Filed March 1, 1963 6 Sheets-Sheet 1

INVENTOR.
LOYD C. SINDEL

BY Bialos & Schlemmer
Attorneys

INVENTOR.
LOYD C. SINDEL

BY Bisbee & Schlemmer

Attorneys

COCONUT DEMEATING APPARATUS AND METHOD

Filed March 1, 1963 6 Sheets-Sheet 3

INVENTOR.
LOYD C. SINDEL

BY Bialos & Schlemmer

Attorneys

COCONUT DEMEATING APPARATUS AND METHOD

Filed March 1, 1963 6 Sheets-Sheet 4

INVENTOR.
LOYD C. SINDEL
BY Bialos & Schlemmer
Attorneys

COCONUT DEMEATING APPARATUS AND METHOD

Filed March 1, 1963

INVENTOR.
LOYD C. SINDEL
BY Bialos & Schlemmer
Attorneys

June 29, 1965 L. C. SINDEL 3,191,651

COCONUT DEMEATING APPARATUS AND METHOD

Filed March 1, 1963 6 Sheets-Sheet 6

INVENTOR.
LOYD C. SINDEL

BY Bialos & Schlemmer
Attorneys 3,191,651

COCONUT DEMEATING APPARATUS AND METHOD

Loyd C. Sindel, Oakland, Calif., assignor to Rogers International Corporation, San Francisco, Calif., a Liberian corporation Filed Mar. 1, 1963, Ser. No. 262,037
35 Claims. (Cl. 146—241)

This application is a continuation-in-part of United States application Serial No. 239,439, filed November 23, 1962, entitled "Coconut Demeating Apparatus and Method," now abandoned. The invention disclosed herein relates generally to an apparatus and method for removing material from a hollow body which carries the the material. More particularly, this invention relates to an apparatus and method for separating material from a shell to which the material is tightly bonded. Still more particularly this invention relates to a high speed apparatus and method for removing meat from a coconut shell section while the coconut meat is fresh and shortly after the shell is divided into sections to expose the meat.

In this regard, the apparatus and method of this invention are designed to remove coconut meat from a shell section in at least one generally continuous stream. In one embodiment disclosed herein substantially all meat is removed from a nut section in at least two continuous streams and such streams are maintained separate during and following removal thereof from the shell so that the streams may be processed separately in any subsequent operations required to prepare the meat for market. In another embodiment, the meat is removed in at least one stream with a predetermined amount of meat being intentionally left in the shell for removal in a subsequent operation for the reasons to be described.

The invention as disclosed herein relates to a semi-automatic procedure in which manual and mechanical operations are combined to effect rapid demeating of one coconut section at a time. However, the inventive concepts contained in this invention also lend themselves to incorporation into a "bank" operation in which a series of semi-automatic machines may be employed simultaneously to demeat a plurality of coconut sections. The inventive concepts hereof also may be incorporated into a fully automatic procedure in which a series of coconut sections may be sequentially demeated in a fully automatic machine without requiring manual handling thereof.

Briefly, the apparatus of this invention consists of four principal assemblies or mechanisms: (1) a driving mechanism for positioning and rotating a coconut section; (2) a knife assembly; (3) program means for actuating the knife assembly through a predetermined path; and (4) a power source mechanism for actuating assemblies (1), (2) and (3) in timed relationship with each other.

Before describing the subject apparatus in detail, brief reference will be had to procedures heretofore generally employed for separating coconut meat from its shell. As is well known, coconuts are available in their largest quantity in countries and areas of the world in which large supplies of manual labor are available. The Philippine Islands is exemplary of such a country. In view of the labor supply available in their countries of origin, coconuts characteristically have been demeated in fully manual operations generally performed by native labor which has achieved, through practice, great dexterity in removing the coconut shell from around the hollow, generally spherical or ovoid body of meat contained therein. That is, the shell generally is split and removed from around the white meat body, leaving the meat intact.

The white coconut meat is bonded to the interior of the shell by a thin skin, generally brown in color. This brown skin generally is more securely bonded to the meat than it is to the shell interior. Accordingly, when a coconut shell is split in a manual operation by native labor, the body of coconut meat is separated from the shell with the brown skin adhered to and surrounding the meat body. Thus it is necessary to remove the brown skin from the meat body before the meat is ready for processing to produce only white meat products.

Commonly, this brown skin is cut or shaved from the body of meat in a manual operation. In this regard, however, irrespective of the dexterity achieved by the person skinning the meat body, and even if extreme care is exercised, a substantial loss of useful meat inevitably results. That is, as a practical matter, it is almost impossible to separate the brown skin from the meat without taking undesirable quantities of meat with the skin, irrespective of the amount of care taken. Furthermore, if extreme care is employed, the operation becomes so time consuming as to offset the advantage of the low cost of the manual labor available to carry out such an operation.

After the skin has thus been removed and separated from the meat, the meat is ready for shredding, desiccating or other processing desired to prepare the meat for market.

In recent years, attempts to mechanize the separation of coconut meat from shells have been made. However, these attempts have been directed generally to the development of methods and apparatus for mechanically performing the procedures in the same general manner heretofore performed manually as above described; namely, separation of the shell from the skin-covered meat body while leaving the meat body intact, and thereafter removing the adhered skin from the meat body by a shaving operation.

This invention is directed to a basically different concept of meat removal, and relates to dividing a coconut shell and its meat body, preferably into substantially equal half sections, and then removing the meat from the individual half sections in a high speed cutting operation in one or more streams.

It has been found that certain types of coconuts, due to the nature of their meat, lend themselves to essentially complete meat removal in a one step operation employing one embodiment of this apparatus and method. However, other types of nuts, due to the nature of their meat, have been found to require a two step meat removal operation which employs a modified embodiment of this invention. To this end, because of the noted characteristic of fresh coconuts to have their brown skin adhere more tightly to the meat than to the shell, this invention as disclosed herein employs a meat removal operation in which at least one stream of skin-free white meat is removed from the shell.

In one embodiment disclosed herein, at least two discrete meat streams are removed simultaneously from a shell, at least one of which is entirely skin-free. In another embodiment, at least one skin-free meat stream is removed from a shell and a predetermined amount of meat is intentionally retained in the shell in adherence with the skin. The embodiment employed for demeating a given coconut is chosen in accordance with the nature of the nut being demeated, which is determined by various factors, such as its country of origin. It has been found that certain nuts lend themselves more readily to a two stream removal operation, than do other nuts.

In the embodiment hereof in which two or more meat streams are simultaneously removed from a shell, one meat stream is separated from its shell section in a cutting operation which removes only pure coconut meat, that is, white meat which includes no brown skin therewith. The other stream is substantially simultaneously removed from the nut section closely adjacent the shell and thus generally includes at least some portions of brown skin due to the secure manner in which the skin adheres to the meat.

In this latter regard, it is preferred, of course, to remove all coconut meat from a shell section without removing any broken skin therewith. However, experience has shown that this situation, while highly desirable, is for all practical purposes not attainable with all types of coconuts. Due to many factors, such as the age of a given coconut, the time elapsed since it left the tree, its country of origin, the condition of the white meat, and the like, the brown skin is adhered to the meat of a given coconut with greater or less tenacity.

While it may be possible with some coconuts, depending upon their condition, to remove substantially all the meat from the shell without brown skin therewith, this invention has been devised so as to be applicable to the effective removal of meat from coconuts of all types and conditions.

Accordingly one preferred embodiment of this invention has been designed for use with certain types of nuts which lend themselves readily to the simultaneous removal of substantially all meat in at least two streams, one of which is entirely free of brown skin and the other of which will include brown skin to a greater or lesser degree, depending upon the tenacity of the skin relative to the coconut shell as determined by the condition of the nut being demeated. The other preferred embodiment hereof has been designed for use with other types of nuts which, due to their nature, do not lend themselves to a complete one step meat removal operation.

As noted previously, heretofore attempts to mechanize the demeating operation have centered on procedures to remove the shell from a coconut meat body retained intact so that the brown skin could subsequently be shaved from the body. However, at least one attempt has been made heretofore to separate meat from a coconut shell along lines somewhat related to the novel concept embodied in the subject application, namely, the dividing of a coconut in half and removing the meat therefrom with a knife assembly. On September 22, 1925, United States Patent No. 1,554,516 was granted to G. D. Olds, Jr. To applicant's knowledge the concept of this patent has never been successfully employed because today the large percentage of coconut meat is still being separated from the shells manually with the procedures heretofore described.

While the subject invention has numerous distinctions over the procedure shown in the Olds patent, and is a specific improvement thereover, an important distinction between this invention and the patent exists in the fact that the patentee purportedly separates coconut meat from a shell half section without removing any adhered brown skin therewith. This, as noted above, has been found as a practical matter not possible. Applicant's invention recognizes the impracticality of attempts to remove all meat without adhered skin and compensates therefor by removing the meat in one or more streams, at least one of which is free of all adhered skin. To insure this, the knife structure of applicant's apparatus is driven through a predetermined programmed path as will be described.

Other distinctions of the improved apparatus and method of this invention over the Olds patent will become apparent from a comparison of this disclosure with the disclosure of the patent.

From the foregoing it should be understood that this invention is directed to a high speed apparatus and method for removing meat from a coconut shell section in at least one stream which is free of brown skin, and to a method and apparatus which, in one embodiment, removes meat generally simultaneously in two or more discrete streams, only one stream of which may include some adhered brown skin while the other streams are entirely free of such skin. In this latter regard, the apparatus includes means for maintaining meat streams thus removed from a shell section separate from each other during and following the meat removal operation so that the stream which includes portions of brown skin may be processed separately to remove the brown skin therefrom when so desired.

Objects of this invention include the provision of an apparatus and method for removing meat from a nut shell; the provision of apparatus for and the method of removing one or more meat streams from a shell; the provision of a method and apparatus, in one embodiment thereof, for removing substantially continuous discrete streams of coconut meat from a coconut shell, one of which may include adhered brown skin portions and the others of which are free of such skin; the provision in a coconut demeating machine of a knife assembly which includes blade structure therewith for removing selectively all or most meat from a shell section in a single cutting operation; the provision in a coconut demeating apparatus of means for driving a knife assembly through a predetermined programmed path; the provision in a coconut demeating apparatus of means for positioning and maintaining a coconut section properly located for meat removal relative to a knife assembly; the provision in a coconut demeating apparatus of a cutting blade structure for removing one or more discrete streams of coconut meat from a shell section; and the provision in a coconut demeating apparatus of means for use in conjunction with a knife structure for maintaining separate discrete streams of coconut meat removed from a shell by the knife structure.

These and other objects of this invention will become apparent from a study of the following disclosure in which reference is directed to the accompanying drawings.

Figures 1, 2:
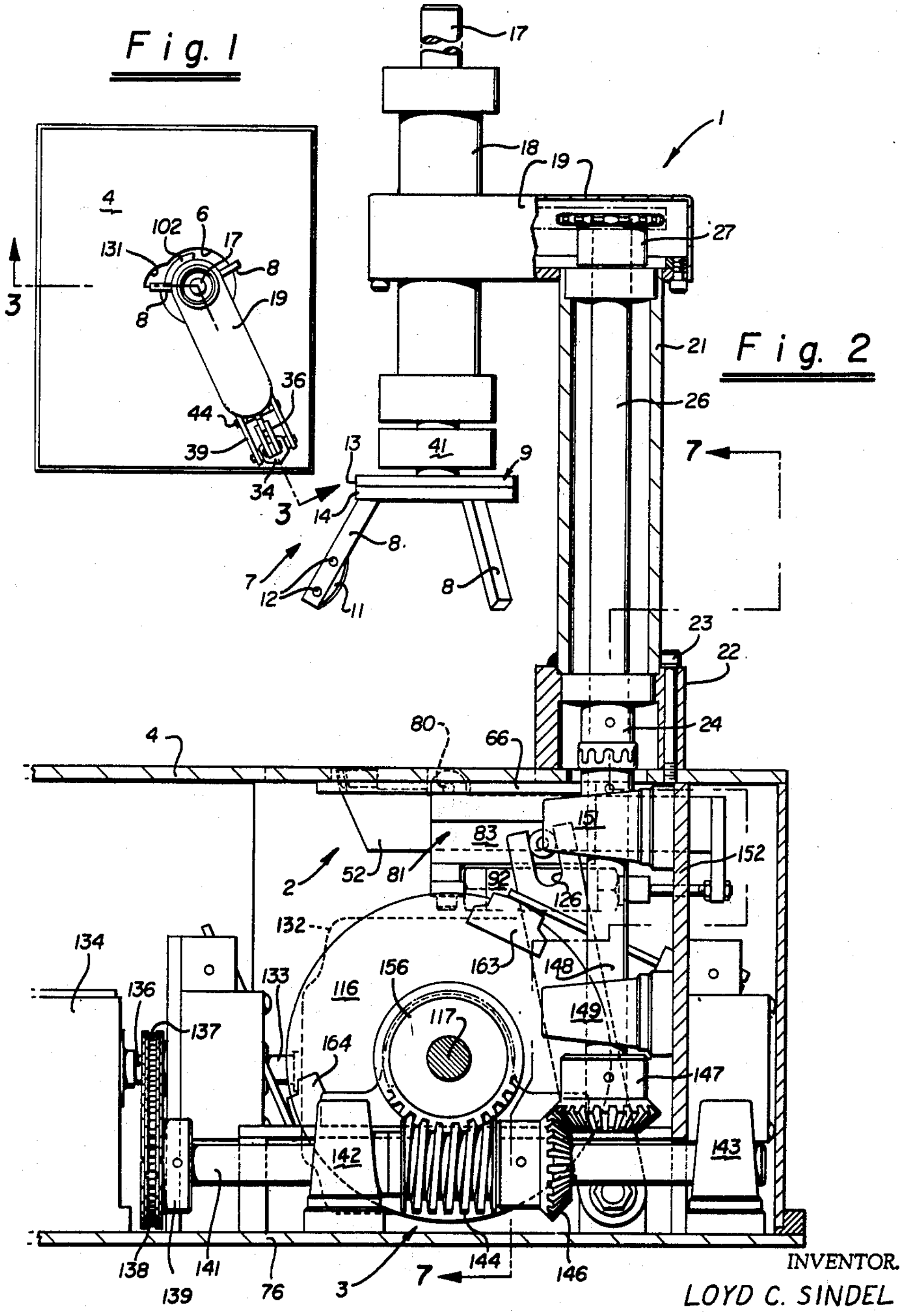
FIG. 1 is a plan view, on a reduced scale relative to the other figures, illustrating the relationship between the various assemblies of the subject apparatus.
FIG. 2 is a front elevational view of the apparatus.

Depending upon the origin of a given coconut, its shell outer configuration prior to dividing may vary from generally spherical to ovoid. In this regard, ovoid shells are generally more common. In this same vein, coconut shells irrespective of their origin generally have a distinct three sided or roughly triangular configuration in transverse cross section. This configuration is pronounced to a greater or lesser degree, depending upon the origin of a given coconut.

This invention is designed to accommodate and successfully remove the meat from a given coconut irrespective of whether its shell is substantially ovoid or generally spherical; and irrespective of whether its shell is of pronounced three sided cross sectional configuration, or approaches a more nearly circular cross section. Similarly, this apparatus is adapted to remove meat from coconuts of varying sizes, a factor which again is determined to a large extent by the country of origin of a given coconut.

Before discussing in detail the illustrated embodiment of the subject apparatus, the novel method of removing coconut meat from a shell will be briefly described.

After a coconut has been divided into two sections, which preferably are of substantially equal size, on a band or circular saw or like device which will impart a generally smooth planar surface to each coconut shell section, each section is then ready for the demeating operation. It should be understood that the substantially clear fluid, commonly referred to as coconut milk, which is contained in the interior of the generally hollow coconut meat body may be removed prior to the dividing operation, for example, by drilling or punching a hole through the relatively soft "eye" which exists at one end of all coconuts. Alternatively, the coconut milk may be allowed to run from the shell during the dividing operation. As coconut milk has no great utility and is easily contaminated, it is not usually retained. However, if it is desired to retain the milk, the first mentioned method of removing the milk prior to dividing a shell may be employed as this permits more easy milk collection.

A coconut half section is then positioned for insertion thereinto of a knife structure including a blade structure to effect the meat removal. A knife structure is provided which is capable of removing one or more meat streams from the nut. As will be described in greater detail hereinafter, the particular knife structure employed is chosen in accordance with the nature and character of the nuts being demeated. Some nuts are well adapted for removal of all meat therefrom as separate streams in one operation. Other nuts are more adapted for the removal of the meat therefrom in more than one operation. The knife blade structure employed is chosen accordingly.

To effect demeating, the shell section and knife structure are rotated relative to each other, preferably by rotating the shell section about its axis while the knife structure is moved positively through a predetermined well-defined programmed path to advance the knife blade structure into the shell so that the meat is removable from the shell section in one or more streams as determined by the nature of the particular nut.

To this end, thorough meat removal is facilitated and insured by positioning the knife structure so that the primary cutting blade structure thereof extends generally at right angles relative to the shell portion engaged thereby in all cutting positions. To further insure effective meat removal, the knife structure is urged laterally under pressure toward engagement with the shell. At the same time, the knife structure is programmed through a predetermined curved, i.e. non-linear, path from a point adjacent the open end of the shell section until the knife structure reaches the end of its path at the upper end or tip of the shell. Thus, a helical cut of meat is taken from the shell.

If the knife structure employed is one which simultaneously cuts more than one meat stream from a nut, the separate streams thus cut are maintained separate during and after removal by a suitable chute means provided in conjunction with the blade structure. One of such meat streams is relatively thin and is cut from that portion of the meat adhered to the shell by the coconut brown skin. Accordingly, although it naturally is preferred to remove no brown skin with this meat stream, some brown skin usually is removed because of the basic nature of the coconut and the tenacity of the skin to the meat. The other stream or streams separated from the coconut with such a blade structure, however, are entirely free of such skin and consist only of pure coconut meat.

If the nuts being demeated are such that their meat does not lend itself to the simultaneous removal of substantially all meat in a single operation, a modified knife structure is employed which removes a predetermined amount of the meat in one or more streams but which is specifically designed to leave a narrow layer of meat, and its adhered brown skin, in the shell for removal in a separate operation, as will be described.

Other important aspects of the meat removal method will be described in greater detail with respect to the description of the apparatus.

Reference is now directed to a preferred embodiment of this demeating apparatus illustrated in the drawings.

Figures 3, 15, 16:
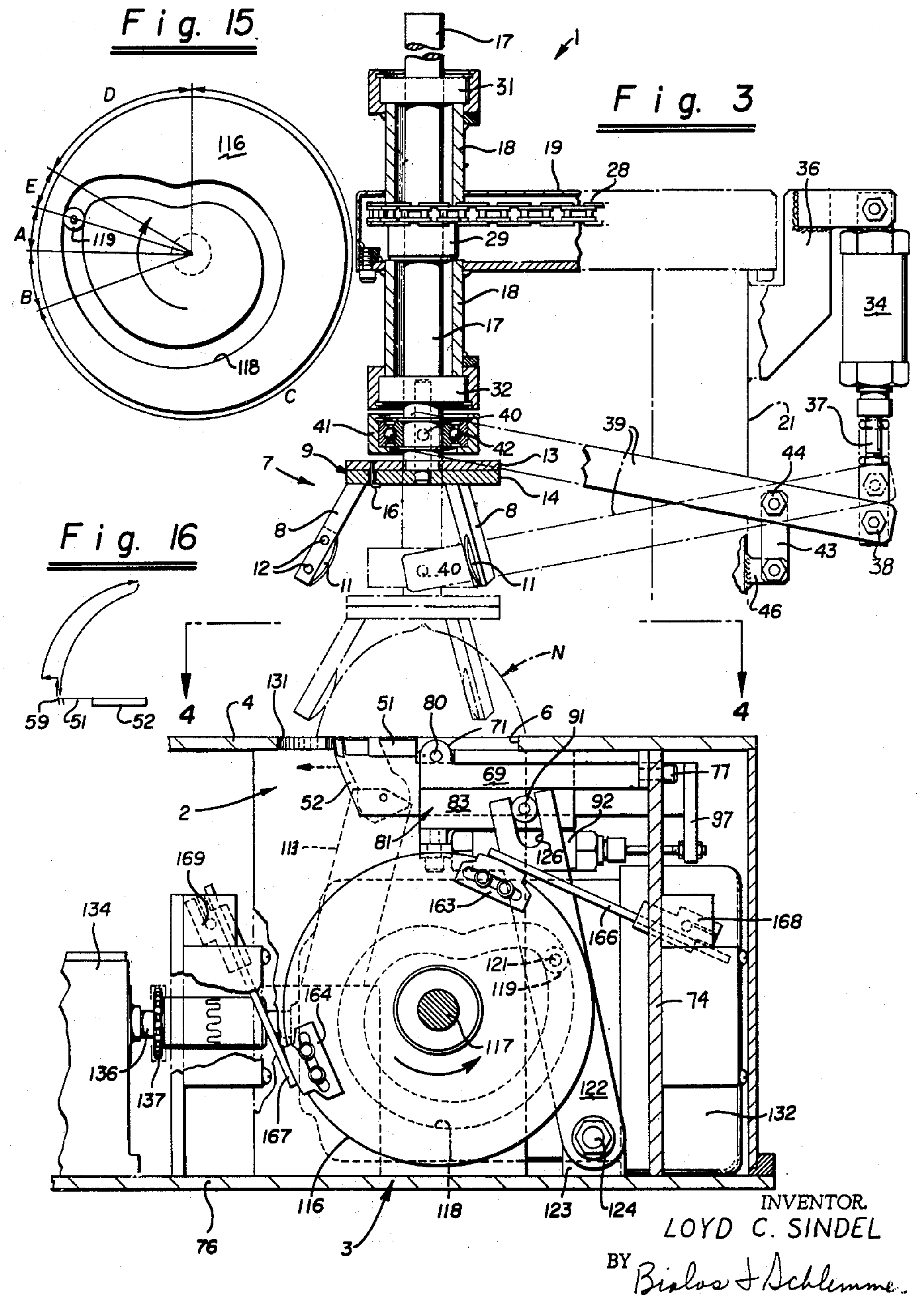
FIG. 3 is a vertical sectional view of the apparatus taken in the plane of line 3—3 of FIG. 1.
FIG. 15 is a plan view of the cam means employed in the programmed drive which actuates the knife assembly.
FIG. 16 is a schematic view illustrating the path followed by the tip of the knife structure during one cutting cycle.

As shown in FIGS. 1–3, the apparatus includes several principal assemblies, including a driving mechanism for positioning and rotating a shell section, generally designated 1; a knife assembly generally designated 2; and program means, generally designated 3, for actuating the knife assembly through a predetermined path. In conjunction with these three principal assemblies, a power source mechanism is employed for actuating the three assemblies above mentioned in timed relationship and sequence with each other.

MECHANISM FOR POSITIONING AND ROTATING COCONUT

The mechanism 1 for properly positioning and rotating a coconut section during meat removal will first be described with specific reference to FIGS. 2, 3 and 7. This mechanism is designed to hold down a coconut section on a bearing surface, which in the embodiment illustrated is provided by a table top bearing plate 4. A suitable aperture 6 of specific contour is provided in the bearing plate over which the nut section is positioned and through which the knife assembly 2 is projectable during the meat removal operation.

Because of the aforementioned characteristic of coconuts to be somewhat three sided, the head structure 7 of the hold-down means includes three prongs 8 depending from a head plate 9. The prongs generally diverge relative to each other beneath the head plate to adapt the same to accommodate nuts of varying sizes. The depending prongs 8 are equally spaced from each other about the axis of the head structure so that such prongs will be similarly oriented relative to the coconut held thereby, irrespective of the degree of triangularity possessed by a given nut.

To insure secure engagement of each prong with the surface of a given coconut section so that the nut section may be positively rotated, sharpened blade members 11 are secured by screws or other suitable fasteners 12 to the lower ends of the prongs. As seen in FIGS. 2 and 3, the blades 11 are formed with generally arcuate, sharp biting knife edges which ensure secure interengagement of the prongs with the coconut when the head structure 7 is moved into engagement with a nut section. Also the arcuate knife edges further adapt the prongs to accommodate therebetween nuts of various sizes with secure biting engagement.

As best seen in FIG. 3, the head plate 9 is formed from two discs 13 and 14 operatively interconnected with each other by a shear pin 16. This pin 16 is securely seated in the upper disc 13 and extends through an aperture in the lower disc 14 and is bent therebeneath to interconnect the two discs for rotation.

It should be understood that the head structure 7 is driven to rotate a coconut section N held down thereby on the bearing plate 4. The shear pin 16 is designed to break to permit relative rotation between the discs 13 and 14 if the prongs 8 are interfered with in any way, such as if the blade structure of the knife assembly 2 to be described should break through the shell of the coconut section and become engaged with the rotating prongs.

The discs 13 and 14 in any suitable manner are mounted on the lower end of a vertically movable and rotatable shaft 17 positioned for movement in a tubular column 18 surrounding the shaft.

The tubular column 18 is supported above the bearing plate 4 by means of a generally horizontally extending structural member 19 which in turn is supported at its outer end by an upright supporting column 21 projecting above the bearing plate 4 and removably secured thereto by a sleeve member 22 welded or otherwise secured to the lower end thereof. Removable bolt fasteners 23 project through the sleeve member into the bearing plate 4 or the framework of the apparatus as best seen in FIG. 2.

At this juncture it should be noted that upon removal of the bolts 23 the entire mechanism for holding down and rotating a nut section on the bearing plate may be removed from the lower portion of the apparatus for maintenance or repair. To this end a separable coupling member 24 is secured to the lower end of upright drive shaft 26 positioned in supporting column 21 for removably connecting the drive shaft with the power source means of the apparatus to be described.

To its upper end, drive shaft 26 has secured a toothed sprocket 27 over which a drive chain 28 passes. Chain 28 extends through the structural member 19 and is operatively connected with and passes over another toothed sprocket 29 operatively secured to the upper end of the aforementioned shaft 17. Thus, upon rotation of drive shaft 26 by the power source of the apparatus, shaft 17 is also rotated through chain 28 to rotate prongs 8 and a coconut section on the bearing plate engaged thereby.

Drive shaft 17 is slidable through sprocket 29 so that the drive shaft may move vertically in the tubular upright column 18. To this end, an elongated keyway in which a connecting key (not shown) is positioned may be employed for non-rotatably securing the sprocket 29 to the shaft 17 while permitting longitudinal movement of the shaft through the sprocket.

Spaced bearing assemblies 31 and 32 as shown in FIG. 3 are positioned around the shaft 17 at opposite ends of column 18 to permit both vertical movement and rotation of the shaft 17 relative to the column.

As seen in FIG. 3 means is provided for moving the drive shaft 17 between its retracted or upper position shown in solid lines and its extended or lower coconut engaging position shown in phantom lines. In the illustrated embodiment such head structure actuating means comprises an air cylinder 34 operatively secured by a bracket 36 welded or otherwise secured to the aforementioned upright supporting column 21. Depending from one end of this air cylinder is a piston rod 37 which is connected with a piston in the cylinder in known fashion. The piston rod is pivotally connected by a nut and bolt assembly 38 to a pair of parallel head actuating lever arms 39.

It should be understood that the air cylinder and its piston rod 37 are operatively connected through conventional conduit means (not shown) to a source of air under pressure by means of which the piston in the cylinder may be actuated to selectively extend or retract the piston rod in conventional and well known manner upon operation of a suitable air cylinder control.

The lever arms 39 are operatively and pivotally connected to the head structure of the coconut hold down mechanism as shown in FIG. 3. A pivot pin 40 extends through the ends of the lever arms into engagement with an enlarged collar 41 mounted adjacent the lower end of the rotatable shaft 17 for longitudinal movement therewith. A bearing assembly 42 is positioned in such collar and permits rotation of the shaft within the collar irrespective of the position of the collar. Between their opposite ends the lever arms 39 are pivotally secured to a brace 43 by a nut and bolt pivot assembly 44. The brace 43 in turn is bolted to a supporting bracket 46 welded or otherwise secured to supporting column 21.

When the piston rod 37 is extended, i.e., located in the solid line position of FIG. 3, the head structure 7 is held in its upper retracted position. Upon actuation of the air cylinder to retract the piston 37, the head structure is moved to its extended or lower postiion due to pivotal movement of the lever arms 39 in a counter-clockwise direction as viewed in FIG. 3 about pivot axis 44. In this regard, an inverted coconut section N positioned over the aperture 6 in the bearing plate 4 is securely held against the bearing plate and is rotated over the aperture upon rotation of shaft 17 being effected.

In the embodiment of the apparatus illustrated, a separate manually actuatable control, in the form of a button or switch, is provided for actuating the air cylinder to move the head structure selectively to its extended coconut hold down position or to its retracted position.

Upon rotation of an inverted coconut section on the bearing plate by the head structure, any lubrication required to facilitate such rotation is supplied by the natural oil contained in the coconut. Because the bearing plate is provided with a smooth upper surface and preferably is formed from hard material, such as steel, and further because the cococonut section is cut to provide a generally flat planar surface, rotation of the nut on the bearing plate is smoothly effected with minimum friction.

KNIFE ASSEMBLY

Figures 4, 5, 6:
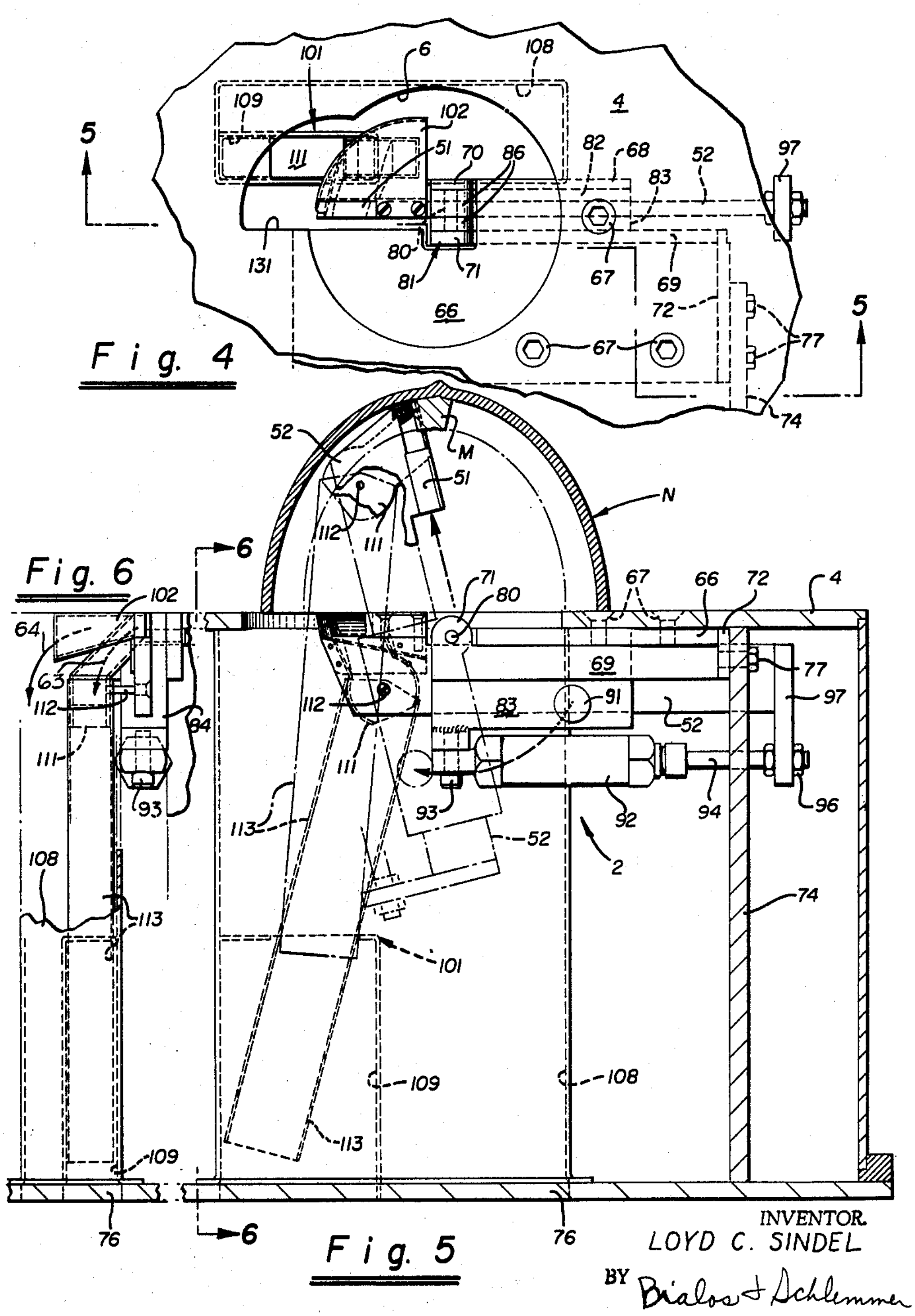
FIG. 4 is a partial plan view of the apparatus taken in the plane of line 4—4 of FIG. 3.
FIG. 5 is a vertical sectional view of the apparatus taken in the plane of line 5—5 of FIG. 4.
FIG. 6 is a vertical sectional view of the lower half of the apparatus taken in the plane of line 6—6 of FIG. 5.

The knife assembly 2 for removing meat from an inverted coconut section rotated on the bearing plate 4 is positioned beneath the bearing plate for controlled projection into the inverted nut section, as best seen in FIG. 5. Details of the knife assembly are shown best in FIGS. 4–6 and 8–11, with one embodiment of a knife structure usable therewith being shown therein.

This assembly includes means mounting a knife blade structure 51 for movement relative to the nut section. Such means includes a flat elongated extensible and retractable carrier or slide member 52 on the end of which the knife blade structure 51 is secured. The knife structure thus extends generally axially of the carrier. The carrier slide member is mounted for extension and retraction relative to the shell of the inverted coconut section positioned over the aperture in the bearing plate 4 in a manner to be described.

To facilitate manufacture and to permit resharpening of the cutting blades of the knife structure when necessary, the knife structure is formed separate from the carrier and is attached to the end thereof by means of screw fasteners 53 which extend through appropriate bores 54 provided in the knife structure. The screws are received in threaded holes appropriately provided in the upper edge of the elongated carrier slide member.

As mentioned previously, it has been found that certain types of coconuts, depending upon such factors as their country of origin, their age, and the like, are well suited to have all or substantially all their meat removed in one continuous meat removal operation. This invention includes in one embodiment of its knife assembly a knife structure specifically designed to thus remove the meat when the nuts are suited to such an operation.

Figures 7, 12, 13, 14:
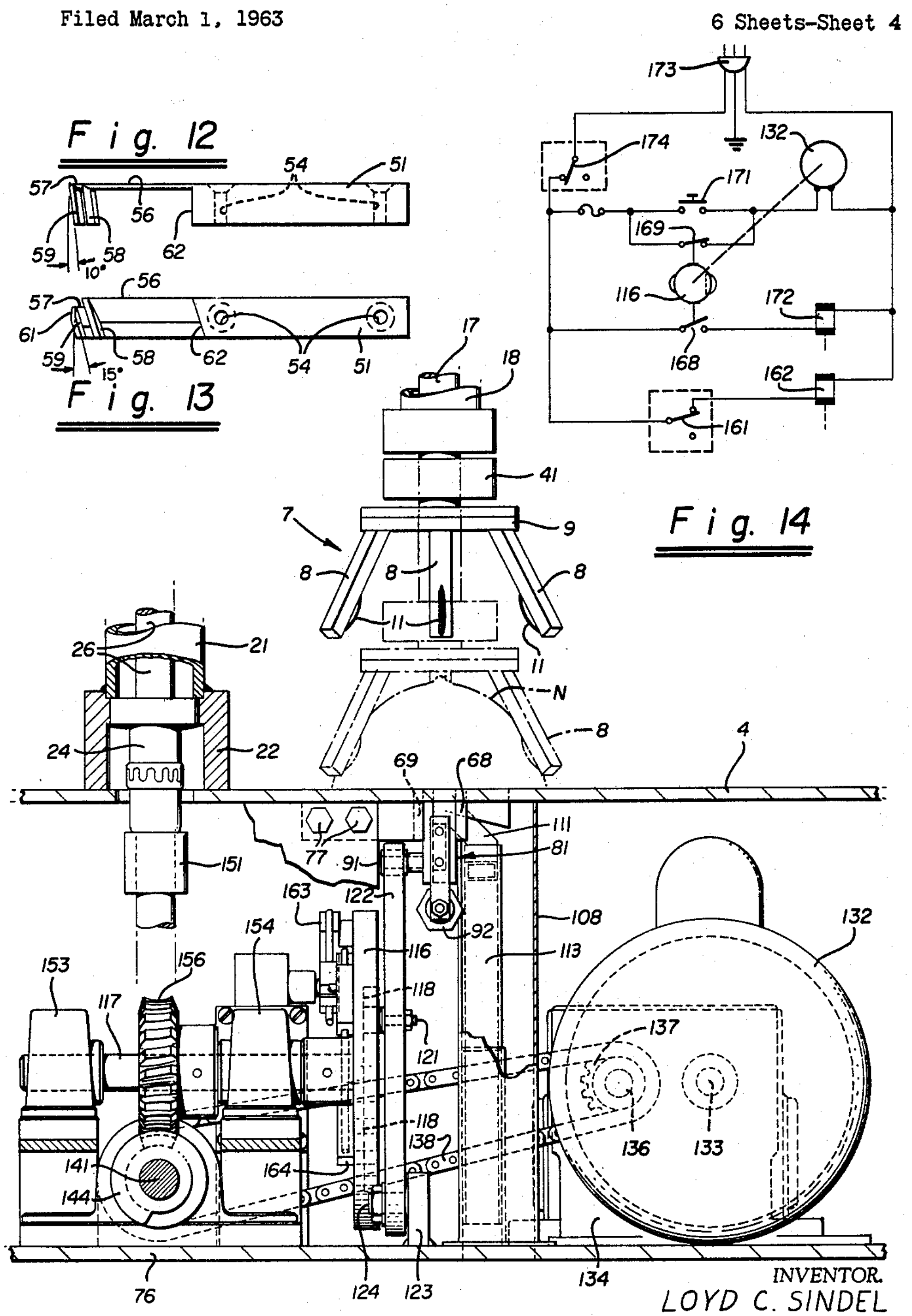
FIG. 7 is a vertical sectional view through the apparatus taken in the plane of line 7—7 of FIG. 2.
FIGS. 12 and 13 are front side and bottom views respectively of one embodiment of the blade structure employable in the knife assembly.
FIG. 14 is a schematic diagram of the electrical system of the apparatus.

Such a knife blade structure 51 is shown in FIGS. 12 and 13 and is designed to remove simultaneously more than one stream of meat from a shell. In this regard, the blade structure shown is designed to remove substantially all meat, with a minimum amount of skin, in a single cutting operation.

The knife structure embodiment shown comprises a pair of inner and outer primary cutting blades 56 and 57. These blades fall generally in the same plane and cooperate in removing a layer of meat during each revolution of a coconut section relative thereto. To effect removal simultaneously of two or more separate streams of coconut meat, the knife structure is provided with two or more cutting blade continuations or extensions for separating each removed layer of meat into two or more separate streams. In the illustrated embodiment, two blade extensions, 58 and 59 respectively, are employed. Each such blade extension is formed to project at an acute angle relative to the sharp aligned cutting edges of the blades 56 and 57, as shown in FIG. 12. Thus the cutting edges of the blade extensions form substantial angular continuations of the cutting edges of the primary cutting blades.

An important feature of the construction of the knife structure is illustrated best by FIG. 13. In this regard, the blade 56 and its cutting extension 58 are offset relative to the associated blade 57 and its extension 59 and are advanced, that is, project forwardly of the same, in the cutting direction. Thus, when the knife structure is inserted into the body of meat of a coconut, the layer of meat removed is cut into two streams by the extension 58. The inner of these streams is cut slightly in advance of removal of the outer stream of meat due to the advanced relationship of inner extension 58 relative to outer extension 59.

This relationship insures effective removal of meat from a shell section. It has been found that if the blades and their extensions are arranged to divide a layer of meat simultaneously into discrete streams, and if outer blade 57 and its extension 59 are arranged to cut in advance of inner blade 56 and its extension 58 that the meat tends to break free of its shell in one stream rather than in separate streams as is desired.

A further important feature of this invention resides in the important relationship between the extensions 58 and 59 of the respective cutting blades. As perhaps best seen in FIG. 12, the blade extensions are arranged so that they diverge relative to each other away from the cutting edges thereof. That is, the blade extensions diverge downwardly as viewed in FIG. 13. This divergence permits a stream of meat to move freely between the blade extensions without blocking. Further importance of this aspect of the knife structure will become apparent hereinafter.

Figures 10, 11:
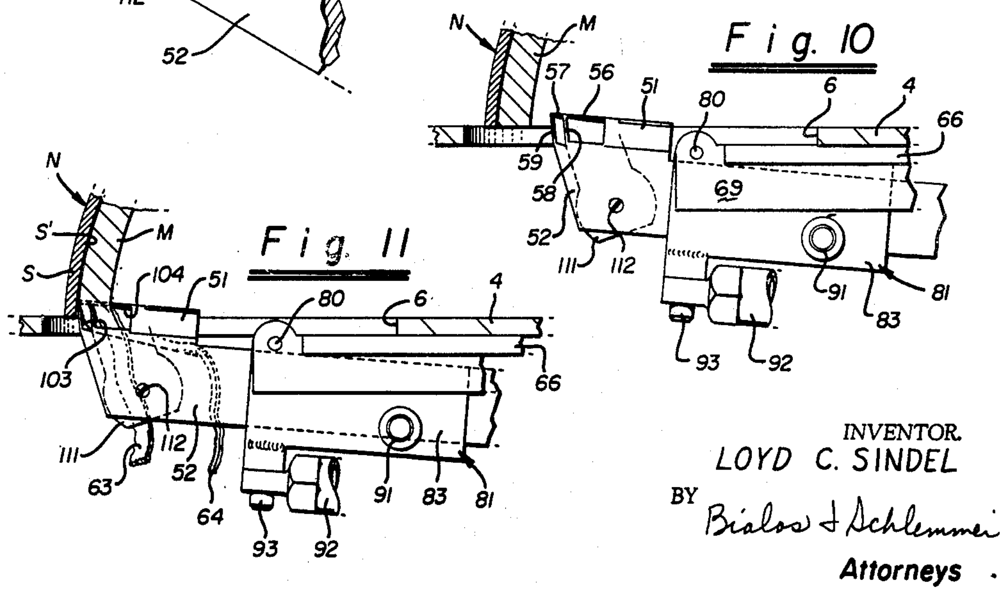
FIGS. 10 and 11 are front elevational views of the knife assembly embodiment of FIG. 8 located in two operative positions.

The angular extension 59 of the blade 57 also serves as a bearing shoe or surface designed to facilitate movement of the knife over the inside surface of the nut shell. As seen in FIG. 13 the blade extension 59 is provided with a curvature 61 at its leading edge. This rounded area is designed to prevent the cutting edge of the blade from digging into the shell during the cutting operation. As best seen in FIG. 11, the curvature 61 causes the blade extension 59 to ride on the inside surface of the shell S of coconut section N so that the meat M is divided into two streams as described. This curvature 61 not only precludes the blade edge from digging into the shell but also serves as spacer means which raises the cutting edge of the extension 59 a fractional distance above the inside surface of the shell to assist in separation of the meat from the shell with a minimum amount of brown skin S' therewith. That is, the cutting edge of the outer blade extension 59 is spaced from contact with the shell by a distance generally equal to the average thickness of the skin of the coconut, thus the tendency of the knife structure is to remove the coconut meat from the shell without removing any skin therewith. Depending upon the condition of the coconut meat, this desirable separation of meat and skin will be effected to a greater or lesser degree.

The spacing between the cutting edges of the blade extensions in a preferred embodiment of the knife structure is approximately 1/16" so that the thickness of the outer meat stream 64 removed is substantially of that thickness. The spacing of the inner blade extension 58 from an adjacent surface 62 (FIGS. 12 and 13) may vary but is chosen of sufficient size to accommodate therebetween an inner stream of meat 63 from any size coconut.

As noted in FIG. 11 in the embodiment shown, the inner stream of meat 63 removed is appreciably wider than the outer stream of meat 64 so that a minimum amount of meat can be combined with pieces of adhered brown skin. In this regard, it is preferred that the spacing of the blade extensions is arranged so that 80%–90% of the meat removed from a given nut will be removed in the inner stream 63 and thus will be free of brown skin; only 10%–20% of the removed meat will be removed in the outer stream 64 and thus no more than that amount can include brown skin which generally is to be separated from the meat in a separate subsequent processing step by any suitable means.

Furthermore, the outer blade extension 59, as shown in FIG. 13 lies in the plane inclined at an acute angle relative to the plane of the blades 56 and 57. This angle is approximately 15° in the embodiment shown, relative to the tangent of a circle which is defined if the knife structure is rotated about its inner end in FIG. 13. The exact angle employed may vary to meet a particular need within limits ranging from 10°–20°, however. The inner blade extension 58 is similarly oriented but is inclined to a somewhat greater extent to insure the diverging relationship mentioned previously. This angular relationship of the trailing edges of the knife structure minimizes the amount of surface of the blade extension 59 that must be forced through the meat when the knife structure is initially advanced into the meat during the initial stages of the cutting operation.

Furthermore, this angular relationship has been found effective in tending to hold the curved portion 61 of the blade extension 59 against the shell of the nut once the cutting operation has become effective in that meat passing over the inner blade extension 58 tends to hold the knife structure against the shell as viewed in FIG. 11. That is, the meat still attached to the shell ahead of the cutting edges of the knife tends to force the extension 59 against the shell. This factor assists the cutting operation in that only relatively light pressure is required to hold the knife structure in its operative cutting position.

Additionally, as shown in FIG. 12, the blade extensions 58 and 59 also are positioned to extend at an acute angle, approximately 10° in the embodiment shown, relative to a plane normal to the plane of blades 56 and 57; i.e., relative to a tangent of the circle defined by rotation of the blade structure about its inner end in FIG. 12. This angular relationship further enhances surface to surface contact of the blade structure with the shell to increase effectiveness of the cutting operation.

Figures 8, 9:
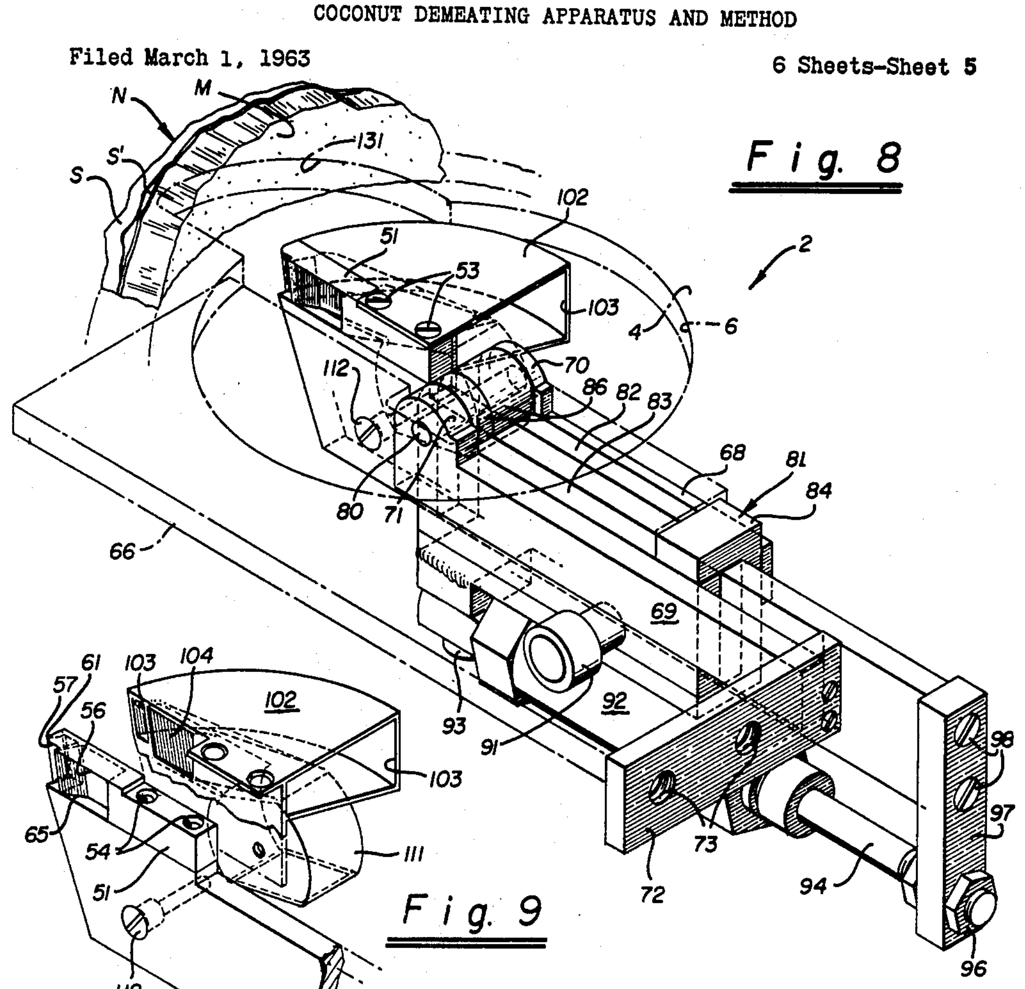
FIG. 8 is an isometric view of one embodiment of the knife assembly employable in the apparatus.
FIG. 9 is a disassembled isometric view of part of the knife assembly embodiment of FIG. 8.

To further insure secure interengagement of the knife structure with the carrier 52 when the knife structure is secured thereto, notches 65 of relatively shallow depth to receive each of the blade extensions are provided in the upper surface of the carrier so that each of the blade extensions is firmly united with the carrier as seen in FIG. 9.

Referring now to FIGS. 4, 5 and 8, it is seen that the knife assembly is operatively positioned beneath the bearing plate 4 by means of an underlying mounting plate 66 secured by screw fasteners 67 to the bearing plate 4. The mounting plate 66 has secured to its undersurface, by welding or other suitable means, a pair of elongated flat, spaced brace members 68 and 69. The brace members are provided adjacent one of their ends with enlarged bosses 70 and 71.

At its other end, brace member 69 is provided with angular extension 72 having threaded bores 73 therein. This extension is engaged with an upright frame member 74 which defines part of the framework of the apparatus to which the bearing plate 4 is secured and which maintains the bearing plate spaced from an underlying base plate 76 as shown in FIG. 5. Screw fasteners 77 extend through openings provided in the frame member 74 and are threadedly received in the bores 73 of extension 72 of brace 69 to further secure the knife assembly in operative position. Extension 72 and its connection to the framework permits removal of the screws 67 from the mounting plate 66 so that the bearing plate 4 may be disengaged and removed from the knife assembly without the knife assembly being disengaged from the framework of the apparatus.

From the foregoing it should be understood that the mounting plate 66 and its associated braces 68 and 69 normally are secured to the bearing plate 4 and provide means pivotally mounting the knife assembly for movement relative to the bearing plate. To this end, a pivot pin 80 is extended through and secured in the bosses 70 and 71 on the brace members 68 and 69. It is about the axis of the pin 80 that the knife assembly pivots during operation of the apparatus.

Interposed between the brace members 68 and 69 is a knife assembly housing 80 which includes a pair of spaced plates 82 and 83 operatively connected with each other at one end thereof by a collar structure 84 through which the aforementioned knife carrier 52 is slidably movable. At their opposite ends the plates 82 and 83 are provided with enlarged contacting bosses 86 through which the aforementioned pivot pin extends. Thus, the knife assembly including the housing 81, the carrier 52, and the knife structure 51 mounted thereon, is pivotal about the axis of pin 80 into or out of the aperture 6 of the bearing plate 4.

Projecting laterally from the housing 81 is a roller or cam follower 91 which forms part of the program drive means to be described hereinafter which actuates the knife assembly.

The knife assembly also includes means for urging the carrier 52 and its associated blade structure towards the shell in all cutting positions of the knife assembly. While various pressure means in this connection could be employed, it is preferred to use constant pressure means, which preferably includes an air cylinder. In the illustrated embodiment, the air cylinder 92 is positioned beneath the housing 81 and is secured thereto at one end thereof by a bolt 93. Projecting from its opposite end is a piston rod 94 which in turn is secured by a pair of nuts 96 to a link 97 secured by screws 98 to the end of the carrier 52, as best seen in FIGS. 5 and 8. The piston rod 94 is actuated by a pressure responsive piston (not shown) located in the cylinder which is movable therein in opposite directions upon changes in internal air pressure as is well known.

Although the conduits of the air cylinder to a suitable air supply are not illustrated, it should be understood that the piston contained in the air cylinder may be moved toward the right or left as viewed in FIGS. 5 and 8 by directing air against a predetermined side of the piston. Preferably, the piston is solenoid actuated as will be described later. Thus the carrier 52 may be extended or retracted selectively relative to the shell of a coconut positioned over the aperture of the bearing plate 4. In this regard, it should be understood that the air cylinder 92 is effective to extend or retract the knife structure on the carrier independently of the pivotal position of the knife assembly as a whole.

A further important feature of the knife assembly includes the provision of chute structure 101 therewith. As noted previously, the modification of the apparatus thus far described is designed to remove simultaneously and maintain separate at least two discrete streams of coconut meat. The chute structure comprises means to insure proper separation of the meat streams during the cutting operation and thereafter so that the inner stream of meat 63 which is free of all brown skin cannot become mixed with the outer stream 64 which may contain skin.

The chute structure includes a guide chute member 102 secured by aforementioned fasteners 53 to the knife structure 51 and carrier 52. The guide chute 102 has progressively and rapidly diverging channels 103 and 104 extending therethrough. Referring to FIG. 11, it is through channel 104 that the inner stream of coconut meat 63 passes, and it is through channel 103 that the outer stream of coconut meat 64 passes. In this regard, as shown in FIG. 11 it should be understood that the inner meat stream 63 passes substantially straight down through the guide chute 102 while the outer meat stream 64 passes laterally through channel 103 behind the channel 104.

Referring now to FIGS. 4–7, it will be noted that a generally vertical discharge chute 108 is positioned beneath one half of aperture 6 in the bearing plate 4 and extends therebeneath to the aforementioned base plate 76. It is into this chute 108 that all material removed from a coconut section, except the meat in inner stream 63, is discharged. Preferably base plate 76 is apertured so that the meat from successive nut sections introduced into discharge chute 108 may fall into a suitable collecting receptacle (not shown) placed therebeneath.

To maintain the inner skin-free stream of meat 63 separate from the skin containing outer stream 64, a separate discharge chute 109 having a generally closed upper end (FIG. 5) is positioned in chute 108. Chute 109 also is positioned over an aperture in base plate 76 so that skin free meat introduced into chute 109 may pass into a suitable collecting receptacle (not shown) positioned beneath the base plate.

The aforementioned guide chute 102 has a bulbous chute section 111 secured thereto in line with the channel 104 therethrough by means of a threaded fastener 112, in the manner shown in FIGS. 5, 6 and 9. Fastener 112 also pivotally secures a chute extension 113 to the bulbous chute section. The lower end of chute extension 113 is slidably received in an opening in the upper end of the aforementioned discharge chute 109 (FIGS. 5 and 6) and connects the bulbous chute section 111 with chute 109 so that all material passing through the inner channel 104 of the guide chute 102 passes directly into chute 109. Thus the skin-free inner meat stream 63 is maintained separate from all other material removed from a given coconut section.

As seen in FIG. 5, the pivotal connection of the chute extension 113 with the bulbous chute section permits the chute extension to travel with the knife structure through all cutting positions of the knife assembly so that all skin-free meat removed will pass directly into a separate collecting receptacle. In this regard it should be understood that all other material removed from the coconut will move through the channel 103 in the guide chute 102 or will fall directly through that portion of the aperture 6 which is not covered by the mounting plate 66. Note FIGS. 4 and 8. Thus any foreign matter inadvertently entering the coconut supply is isolated with the meat stream which includes brown skin.

It should be understood that if the knife structure employed in the knife assembly 3 is provided with more than two cutting blade extensions so that more than two discrete meat streams are separated simultaneously from a given nut section, that the chute structure 101 would be modified accordingly to maintain all such streams separate from each other if such separation were desired.

As mentioned previously, it has been found that certain types of coconuts are not particularly well suited to have substantially all their meat removed in one demeating operation in the manner described above. That is, while it has been found that a knife structure 51 of the type described previously is highly effective for its intended purpose when employed with many types of nuts, it has also been found that certain types of nuts require a modified type of blade structure for effecting meat removal.

With certain types of coconuts, it is preferred to remove a predetermined portion of the white meat therefrom in a continuous operation while intentionally leaving behind a small amount or thin layer of white meat adhered to the skin bonded to the coconut shell interior. In such a case, the meat remaining behind in the shell is removable from the shell in a subsequent operation of any suitable type, which could, if desired, employ the construction of this invention provided with a particular knife blade structure designed to remove the thus remaining meat.

Reference is now directed to FIGS. 17 through 20 which illustrate a modified knife blade structure which is designed to remove the majority of the white meat from a coconut section but which is further designed to leave a predetermined minor amount of meat in engagement with the shell.

In this regard, it should be understood that the modified knife blade structure shown could be provided with more than one cutting blade extension if it is found desirable to separate the meat from the shell in more than one stream. However, with the modified knife blade structure shown, it is generally preferred that a single stream of skin-free white meat is removed in a continuous operation in that no particular advantage is obtained by removing the white meat in more than one stream due to the fact that the meat is free of skin.

With respect to the knife blade structure embodiment shown in FIGS. 17 through 20, the same reference numerals primed are employed to designate components which correspond to the components of the blade structure described previously with respect to FIGS. 12 and 13. Thus, the modified structure 51' has a pair of through bores 54' to receive therethrough screw fasteners for securing the modified blade structure to the carrier 52 of the knife assembly.

The modified structure in the embodiment illustrated comprises a single primary cutting blade 56' having a blade extension 59' which extends at an acute angle relative to the sharpened cutting edge of blade 56'. As mentioned previously, because the modified structure shown is designed to leave a predetermined amount of coconut meat and skin attached thereto in the shell, only one blade extension 59' is employed as opposed to the two or more blade extensions utilized in the previously described blade structure 51.

Figure 18:
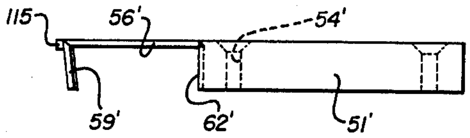
FIGS. 18, 19 and 20 are front side, bottom and end views respectively of the modified embodiment of the blade structure employable in the knife assembly.
Figure 20:
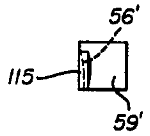
Figure 19:
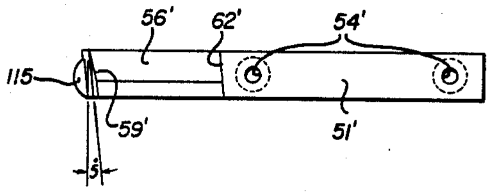
Figure 17:
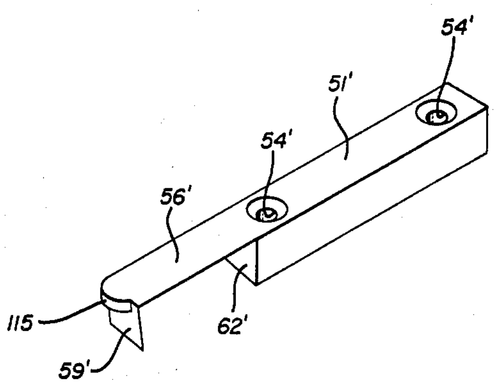
FIG. 17 is an isometric view of a modified embodiment of the blade structure employable in the knife assembly.

An important distinction of the knife blade structure of FIGS. 17 through 20 over that described previously is the manner by which the modified structure precludes removal of a predetermined amount of meat from the shell during the demeating operation. This is effected by providing spacer means which comprises a blade portion defined by an unsharpened relatively blunt projection 115 which extends longitudinally from the knife blade structure generally in line with the cutting blade 56' thereof. As seen in FIG. 19, preferably such projection is rounded to facilitate riding of the same over the internal surface of a coconut shell. As seen in FIG. 20, such projection is of relatively narrow contour compared to the length of the blade extension 59'.

The function of the projection 115 is to space the cutting edge of blade extension 59' a predetermined distance outwardly from the skin carried on the internal periphery of a coconut shell section so that a layer of coconut meat having a thickness substantially equal to the projecting dimension of the projection 115 is retained in the shell with the adhered skin. Thus, when the spacer projection rides on the inner nut periphery during a cutting operation, so that the cutting extension 59' is spaced therefrom, assurance is had that all brown skin is maintained separate from the white meat removed from the shell by the modified blade structure disclosed.

Even though the projection 115 is rounded and relatively blunt so that it will not cut into the shell of a coconut as it rides thereon, the projection will pass through the retained meat layer in the coconut section and will form a more or less helical cut therein. When such a cut occurs, it has been found that this cut facilitates separation of the retained meat from the shell in that the retained meat frequently may be removed merely by inverting the shell and pounding the same on a hard surface. If such a procedure does not result in removal of the retained meat, a separate cutting operation may be employed to remove the remaining meat from the shell and therewith at least some skin. In this regard, it should be understood of course that, because the modified construction employs a generally blunt spacer projection but does not employ a cutting extension closely adjacent the shell, as is employed in the embodiment of FIGS. 12 and 13, that a predetermined portion of the meat will be retained in the shell.

Generally the inclination of the cutting extension 59' in one direction is somewhat less than the angle of inclination employed with the extensions employed with previously described knife structure. In this regard, an angle of inclination of approximately 5° has been found suitable, as shown in FIG. 19. However, the inclination of blade extension 59' in its other direction is generally the same as in the other embodiment, as is seen by comparing FIGS. 12 and 18.

While the exact length of the projection 115 from the inner end of extension 59' may vary, a projection of about 1/16" has been found suitable, so that a meat layer of approximately that dimension is retained in the shell.

By employing the modified knife structure shown in FIGS. 17 through 20, assurance is had that no skin will be removed with the thick stream of white meat cut from a given nut section in that it is specifically planned that a minimum thickness layer of white meat with its attached skin will be retained in the nut.

With the embodiment of the modified blade, it is still intended that a chute structure 101 would be employed to receive and guide the continuous stream of meat removed from a shell, but the plural diverging channels employed with the chute structure 101 described previously would not be required unless the modified knife structure is provided with more than one cutting blade extension.

Because both embodiments of the knife structure 51 and 51' disclosed herein are readily substitutable with the subject knife assembly, a given apparatus may be rapidly modified for the demeating of a particular type of nut by inserting the particular knife structure which is best adapted for use with a particular nut.

PROGRAM MEANS FOR KNIFE ASSEMBLY

Reference is now directed to FIG. 3 which illustrates the means 3 for positively moving the knife assembly through a non-straight, i.e., non-linear, curved predetermined programed path into an inverted coconut section. To this end such means in the embodiment shown includes cam drive mechanism comprising a generally circular cam plate 116 mounted on a rotatable shaft 117 for rotation therewith. In the inner face thereof, the cam plate is provided with a cam groove 118 of predetermined contour and closed path.

A cam follower 119 is rotatably mounted on a pin 121 which projects from a knife assembly actuating arm 122. As seen in FIGS. 3 and 7 the actuating arm 122 is pivotally connected to the aforementioned base plate 76 by means of an upright bracket 123 and a pivot pin 124 maintained in place therethrough by a suitable nut or like fastener. At its upper end the actuating arm 122 is provided with a slot 126 in which the aforementioned cam follower 91, which projects from the knife assembly housing 81, is movably received.

Upon rotation of the cam plate 116, the actuating arm 122 will be moved selectively toward and away from the axis of the shaft 117 in accordance with the path of the cam groove 118 to progressively pivot the knife assembly through or retract the same from the bearing plate 4 through the aperture 6 therein. It should be noted in this regard, that the knife assembly is pivotally advanced into a nut section, rather than being inserted thereinto in a straight line path.

This pivotal movement of the knife assembly through a predetermined generally arcuate path results in a generally helical cut being taken from the meat of the coconut rotated thereover. Because the knife assembly is pivotally mounted, the knife structure 51 or 51′ employed in the assembly, and its associated carrier 52, are positioned generally at right angles relative to the adjacent portion of the coconut shell to be contacted thereby in all positions. Note FIGS. 5, 10 and 11. At the same time, it should be understood that the piston rod 94 of the air cylinder 92, when retracted toward the air cylinder, effects urging of the knife structure under constant pressure into the meat in all cutting positions.

As seen in FIG. 5, with the pivotal mounting arrangement disclosed, all meat is removable from the inverted coconut in that the knife assembly may be moved to a fully vertical position if desired to insure removal of all meat, including that lying at the very top or tip of the inverted shell section. In this regard, because the knife structure 51 or 51′ of the knife assembly is, in all cutting positions, arranged at generally right angles to the shell, the knife structure is fully effective irrespective of the pivotal location of the knife assembly.

Reference is now directed to the generally schematic showing of FIG. 15 which illustrates the programed drive path defined by the cam groove 118. The groove is divided into five sections, designated A through E, each of which effects a particular operation. In FIG. 15 the cam follower 121 of actuating arm 122 is positioned in its location for the start of the cutting cycle; that is, with a nut section properly positioned on the bearing plate 4.

Upon initial rotation of the cam plate, following initiation of rotation of the nut section on the bearing plate, the cam follower moves through the short section A of the cam groove. This effects limited pivotal movement of the knife assembly through the aperture 6 so that the blade extensions 58 and 59 of blade structure 51, or extension 59′ of blade structure 51′, are inserted only partially, about one half their length, above the bearing plate 4 as shown in FIG. 10. During this operation, the carrier 52 is held retracted and out of contact with the coconut meat by the air cylinder 92. When the assembly reaches the position shown in FIG. 10, the air cylinder 92 is actuated to extend the carrier laterally to bring the blade structure into engagement with the coconut meat to initiate the cutting cycle.

The section B of the cam groove is of constant radius relative to the axis of the cam plate so that no further pivotal advance of the knife assembly into the shell is effected during the time the cam follower rides through section B. During such time, the coconut is rotated at least one complete revolution above the aperture in the bearing plate. This dwell period insures that the first cut taken from the meat will reach to the shell, as shown in FIG. 11. The knife assembly is maintained generally stationary during the first effective revolution of the coconut relative to the knife so that the intended amount of meat removal at the edge of the shell is insured. That is, the knife first cuts its way to the shell if the knife structure of FIGS. 12 and 13 is employed, or to a location spaced from the shell an amount equal to the length of projection 115 if the knife structure of FIGS. 17–20 is employed; and the nut is then rotated one full turn to insure complete meat removal during this first cut with the FIGS. 12 and 13 knife, or uniform meat removal with the FIGS. 17–20 knife. Low force may be employed to urge the knife blades into the meat progressively to the predetermined desired amount.

Thereafter, during the time the cam follower passes through section C, the knife assembly is progressively pivoted from the FIG. 10 position to or beyond the position shown in FIG. 5. In this regard, because the knife assembly is continuously pivoting while the nut is rotating thereover, the meat is removed in a generally continuous spiral path so that one or more generally continuous streams of meat are removed depending upon the knife structure modification employed. In this connection, depending upon the character and condition of the meat of a given nut, the meat may be removed from a given shell as one or more continuous one piece helical streams, or the meat may break off in smaller sections in each stream. While the actual character of the meat streams is determined by the condition of the meat being cut, the knife structure of this invention is capable of cutting simultaneously one or more continuous helical streams if that is desired.

When the cam follower passes from section C into section D, the cutting cycle for a given nut has been completed and the knife structure is retracted from the shell and then the knife assembly is pivoted to its retracted horizontal position below the bearing plate 4 as shown in FIG. 3.

During travel through the remaining section E of the cam groove, the cam plate is brought to a stop and the cam follower is positioned for initiation of another cutting cycle.

The path traced by the end of the knife structure defined by blade extension 59 (or projection 115 if the modified knife structure is employed) is shown schematically in FIG. 16.

Reference is now directed to FIGS. 4 and 8. The shape of the aperture 6 provided in the bearing plate 4 is generally circular for the majority of its periphery and its diameter is determined by the average diameter of coconuts so that a given coconut section will substantially cover the aperture during the demeating operation. Along one edge, however, the aperture is provided with an extension 131, the shape of which conforms generally to the configuration of the guide chute member 102 on the knife carrier 52. This aperture extension permits movement of the knife assembly laterally to its fully extended position during the initial phase of the cutting operation, as seen in FIG. 11. The mounting plate 66 is positioned to close off one side of the aperture (FIG. 4) so that all meat cut will pass into the chute structure as described previously.

POWER SOURCE MECHANISM

Reference is now directed to FIGS. 2, 3 and 7 for a description of the mechanism employed to actuate the rotatable head structure of the coconut hold down assembly, as well as the cam programed drive for the knife assembly. To this end, a single power source for the entire apparatus, preferably an electric motor 132 of suitable size, is mounted on base plate 76. A drive shaft 133 projects from the motor and operatively connects the same with a gear reduction unit 134. The reduction ratio of this unit may vary depending upon the particular results desired. A 20 to 1 reduction ratio has been found suitable when the motor 132 is driven at 1800 r.p.m. Projecting laterally from the gear reduction unit is a shaft 136 which has a sprocket 137 thereon over which a driven chain 138 passes.

This chain passes over a second sprocket 139 mounted on the end of a motion transmitting shaft 141 extending between and rotatable in spaced bearings 142 and 143 secured to the base plate 76 as seen in FIG. 2. Shaft 141 has a worm gear 144 positioned thereon intermediate its ends and a bevel gear 146 secured thereto adjacent the worm gear.

Another bevel gear 147 is positioned on the lower end of an upright drive shaft 148 which is secured by the aforementioned releasable coupling 24 to the drive shaft 26 which actuates the head structure 7 of the coconut hold down assembly. Drive shaft 148 is rotatably mounted in spaced bearings 149 and 151 projecting from frame member 152 of the apparatus framework.

The cam plate 116 is positioned on one end of the aforementioned shaft 117 which is rotatably supported in a pair of spaced bearings 153 and 154 as shown in FIG. 7. Intermediate the bearings, and mounted on shaft 117, is a gear 156 meshed with the aforementioned worm gear 144. With the arrangement thus described, all components of the subject apparatus are driven in timed relationship relative to the other components from the single power source 132.

GENERAL OPERATION AND CONTROLS

While the apparatus and its respective components may be operated at varying speeds, depending upon the type of nuts being demeated and the results desired, generally high speeds are attainable. In the semi-automatic operation disclosed, the entire cutting cycle for a half nut section may be completed in 20 seconds or less. Of this time, 16–18 seconds are taken up with the actual cutting operation, while 1–2 seconds are employed in manually positioning the nut on the bearing plate, and another 1–2 seconds are employed in removing the demeated shell section from the bearing plate.

While, as mentioned previously, this invention may be incorporated into fully automatic apparatus in which nut sections are fed, demeated and removed without any manual handling, the subject semi-automatic apparatus disclosed has been devised for low cost production for use in the countries of origin of coconuts where labor is usually plentiful and relatively inexpensive. In this regard, a single operator of average skills could operate a "bank" of six or eight semi-automatic machines each of which embodies the disclosed construction.

The operational relationship between the various assemblies in a preferred embodiment of the apparatus will now be described. In a high speed operation the nut sections being demeated may be rotated in the range of 60–120 r.p.m. It has been found that a speed suitable for demeating most types of nuts is 90 r.p.m.

The cam member 116 is arranged to rotate in predetermined timed relationship with respect to the speed of rotation of the nut section being demeated to insure effective meat removal. To this end, by providing suitable gearing, the cam is mounted to rotate through one complete revolution for each 30 revolutions of the nut section when the nut is rotated at the preferred speed set out above. During each revolution of the cam the nut is completely demeated in the manner described.

Referring now to FIGS. 12 and 18, while the width of the blade extensions 59 and 59′ may vary, effective results have been obtained if such extensions are approximately ⅜″ wide. Thus the knife structure theoretically could be advanced approximately ⅜″ into the inverted shell during each revolution of the nut to remove a continuous stream of meat without any meat loss. However, in the described embodiment which employs a 1:30 revolution ratio between the cam plate 16 and the coconut, effective results are obtained if the knife is advanced into the shell a distance slightly less than the full width of the blade so that overlapping cuts are taken. With a ⅜″ blade extension, an advance of $\frac{5}{16}$″ for each revolution of the nut has been found effective.

As mentioned previously an air cylinder 92 for urging the blade structure into the meat preferably is employed because of the substantially uniform pressure which can be applied to the blade structure, irrespective of the position of the blade structure in the inverted coconut shell. In this regard, only a relatively low force is required, with a total force of only 7–8 pounds being found suitable for effective operation. Force on the knife blades within the range of 5–10 pounds will normally be effective for all types of nuts.

Use of an air cylinder has additional advantages in that the knife structure will not be damaged if the knife blade strikes an obstruction in the shell because the air in the cylinder may be compressed to allow the blade to retract rapidly and pass over the obstruction without interrupting operation of the apparatus. Also, because the knife structure is free to move in and out as the internal curvature of the shell varies, this apparatus has been found fully effective for demeating nuts that depart appreciably from circular shape in cross-section.

As mentioned, the disclosed apparatus is semi-automatic and combines both manual and automatic steps in its operation. To this end, referring to the diagram of FIG. 14, a separate control is provided to actuate the head structure 7 of the hold down assembly. Such a control, preferably a selector switch 161, may be located in a control panel (not shown) positioned at a convenient location for access by the machine operator. Upon actuation of such a switch, the air cylinder 34 is selectively actuated through a solenoid 162 to extend or retract the head structure for holding down or releasing a coconut section.

In this same regard, it is preferred that when a nut is in position, and the cutting cycle is initiated, that the cycle be automatically completed without requiring further action by the operator until the head structure is to be retracted to remove the demeated nut section. To this end, the cam plate 116 is provided with trip members 163 and 164 which project laterally from the periphery thereof for engagement with the arms 166 and 167 of electrical control switches 168 and 169 respectively, as seen in FIG. 3.

Again referring to FIG. 14, a control switch 171 is provided at the control panel for actuation by the operator to initiate a cutting cycle. Upon the operator actuating such a start cycle control the motor 132 is actuated to effect rotation of the hold down plate structure 7 and the knife actuating cam member 116 through the gear train mentioned previously.

Cam actuated switch 168 is operatively connected through a solenoid 172 in a known manner with the air cylinder 92 which extends and retracts the piston rod which actuates the knife carrier 52. The other cam actuated switch 169 controls operation of the motor to stop the machine upon the completion of a cutting cycle.

Referring now to FIGS. 3 and 15, upon initiation of a cutting cycle, switch 168 is briefly held closed due to the engagement of its arm 166 with the trip member 163 on the cam. Thus during a brief initial period of rotation of the cam plate, the knife assembly is rotated approximately half the width of the knife blade into the shell to the position shown in FIG. 10. When the knife reaches such position, the switch arm 166 clears the trip member 163 so that the switch 168 is opened to actuate solenoid 172 and thus the air cylinder 92, to extend the knife carrier. The knife carrier is maintained extended by the air cylinder 92 until the cam follower reaches the end of section C of the cam groove at which time cam switch 168 is again closed and the carrier is fully retracted. Following completion of retraction of the knife assembly, the cam plate rotates until the trip 164 actuates cam switch 169 to close the same and stop the motor to end the cycle.

As seen in FIG. 7 the respective cam trips 163 and 164 are laterally spaced so that each trip will actuate only its associated switch arm.

Still referring to FIG. 14, the apparatus is provided with power to motor 132 by plugging the apparatus into a conventional 110 volt, single phase, 60 cycle outlet through a suitable plug 173. An on/off master control switch 174 also preferably is positioned in the control panel for access by the operator.

Having thus made a full disclosure of this invention attention is directed to the appended claims for the scope to be afforded thereto. In this connection, modifications to the apparatus and method disclosed herein which may become apparent to one skilled in the art after reference has been taken to this disclosure are contemplated as falling within the scope of the appended claims.

I claim:

1. A method of removing meat from a shell in at least one well defined stream, comprising the steps of providing a shell section having meat therein and carried thereby, providing knife structure including a blade for removing meat from said shell, supporting said shell only externally thereof, rotating said knife structure and said shell relative to each other, and during such rotation moving said knife structure and said blade thereon through a positively controlled predetermined curved and non-linear path while simultaneously urging said blade toward said shell in all positions of said knife structure.

2. A method of removing coconut meat from a coconut shell in at least one well defined stream, comprising the steps of providing a hollow shell section having meat therein and carried thereby, providing knife structure including a blade for removing meat from said shell, supporting said shell only externally thereof for rotation, rotating said shell relative to said knife structure, during such rotation pivotally advancing said knife structure through a positively controlled predetermined non-straight path, and during such advance urging said blade toward said shell generally at right angles relative thereto in all positions of said knife structure.

3. The method of claim 2 which includes the steps of removing said meat from said shell in at least two discrete streams with said knife structure, and maintaining said streams thus removed separate from each other during and following removal thereof from said shell, whereby said streams may be processed separately following such removal.

4. The method of claim 2 which includes the step of removing said meat from said shell with said knife structure in at least one generally continuous stream while leaving a predetermined amount of said meat in said shell for removal subsequently.

5. A method of separating coconut meat from its shell comprising positioning an inverted coconut section over an aperture in a supporting plate, supporting said shell only externally thereof on said plate so that the interior of said shell is maintained unrestricted, rotating said coconut on said plate over said aperture, during such rotation inserting a knife structure through said aperture and urging the same into said meat adjacent said plate, thereafter moving said knife structure through a predetermined programmed path so that a generally helical cut of meat is removed from said shell from adjacent said plate to the top of said shell, and maintaining said knife structure generally normal to said shell in all positions of said knife structure in said path.

6. A method of separating coconut meat from a coconut shell comprising positioning an inverted coconut half section over an aperture in a supporting plate, supporting said shell only externally thereof on said plate so that the interior of said shell is mainatined unrestricted, rotating said coconut on said plate over said aperture, providing a knife structure, during such rotation pivotally inserting said knife structure through said aperture and thereafter urging the same laterally into said meat adjacent said plate, thereafter continuing pivotal movement of said knife structure through a predetermined positively controlled curved path while simultaneously urging the same laterally into engagement with said shell, and retracting said knife structure through said aperture when a predetermined amount of meat has been removed from said shell by said knife structure.

7. The method of claim 6 which includes the steps of removing said meat from said shell with said knife structure in at least two discrete streams, and maintaining the streams of meat thus removed separate from each other during and following removal thereof from said shell, whereby said streams may be processed separately following such removal.

8. The method of claim 6 which includes the step of removing said meat from said shell with said knife structure in at least one generally continuous stream while leaving a predetermined amount of meat in said shell for removal subsequently.

9. A method of separating coconut meat from a coconut shell in at least two separate streams, comprising positioning a half coconut over an aperture in a supporting plate, supporting said shell only externally thereof on said plate so that the interior of said shell is maintained unrestricted, rotating said coconut on said plate over said aperture, during such rotation inserting a knife structure having at least two spaced cutting edges through said aperture and urging the same laterally into said meat adjacent said plate, thereafter moving said knife structure through a predetermined curved positively controlled path extending from adjacent said plate to the top of said shell while maintaining said knife structure generally normal to said shell in all positions of said knife structure in said path, whereby each of said cutting edges separates a stream of coconut meat from said shell, and maintaining said streams of meat separate from each other during and following such separation, whereby said streams may be processed separately.

10. A method of separating a predetermined amount of coconut meat from a coconut shell in at least one generally continuous stream, comprising positioning an inverted coconut section over an aperture in a supporting plate, rotating said coconut section on said plate over said aperture, during such rotation inserting a knife structure having at least one cutting edge and spacer means on the end of said structure through said aperture and urging the same laterally into said meat adjacent said plate, thereafter moving said knife structure through a predetermined curved controlled path extending from adjacent said plate to the top of said coconut section while maintaining said one cutting edge spaced from said shell by said spacer means, whereby said cutting edge separates a generally continuous stream of meat from said shell while said spacer means effects retention of a predetermined amount of meat in said shell.

11. A method of separating two streams of coconut meat from a coconut section which includes a layer of brown skin interposed between the white coconut meat and the coconut shell, comprising rotating said coconut section about its axis, inserting a knife structure which includes a pair of spaced cutting blades partially into said section while said section is rotating relative to said knife structure, as said section is rotating urging said knife structure laterally into said meat until a portion of one of said blades contacts the skin and said shell with the other blade spaced from said shell, continuing rotation of said section and progressively advancing said knife structure further into said section in a curved controlled path while maintaining said one blade generally in contact with said shell and the other blade out of contact with said shell. whereby two streams of meat are separated from said shell, one of said streams including only coconut meat free of skin and the other of said streams including at least some brown skin mixed with the meat thereof, and maintaining said streams separate from each other during cutting and thereafter so that said other stream may be separately processed to remove said skin therefrom.

12. A method of removing two separate streams of coconut meat from a coconut section which includes a layer of brown skin interposed between the white coconut meat and the coconut shell, comprising rotating said coconut section, partially pivotally inserting a knife structure which includes a pair of spaced cutting blades into said section about a pivot axis while said section is rotating relative to said knife structure, as said section is rotating urging said knife structure laterally into said meat until one of said blades contacts the skin on said shell with the other blade spaced from said shell, continuing rotation of said section while simultaneously, progressively, pivotally advancing said knife structure about said axis in an arcuate path while maintaining said one blade against said shell, whereby two streams of meat are separated from said shell, one of said streams including only white meat free of skin, the other of said streams including some brown skin mixed with white meat, and introducing said streams into separate chute sections to thereby maintain said streams separate from each other during cutting and thereafter, so that said other stream may be separately processed to remove said skin therefrom.

13. The method of claim 12 in which said other blade is passed through said meat in advance of said one blade so that said skin-free stream of meat is separated from said shell in advance of said other stream.

14. A method of removing coconut meat from a coconut shell, comprising providing a knife assembly having a cutting blade which includes a portion thereof for engaging the interior of a coconut shell during removal of meat from the shell, mounting said knife assembly for pivotal movement relative to said shell, pivoting said knife assembly into said shell while said cutting blade is free of contact with said meat until said blade is only partially inserted into said shell, rotating said shell relative to said assembly, while said shell is rotating urging said cutting blade laterally into contact with said meat, continuing rotation of said shell through at least one revolution with said blade in contact with said meat while maintaining said knife assembly stationary whereby said blade progressively cuts into said meat until said blade portion contacts said shell. thereafter progressively pivoting said knife assembly into said shell while maintaining said blade portion against said shell interior during continued rotation of said shell, whereby said meat is separated from said shell by said cutting blade in a generally constant stream.

15. Apparatus for removing meat from a shell, comprising a knife assembly insertable into said shell for removing the meat therefrom, said assembly including a cutting blade, means mounting said knife assembly for non-linear movement into said shell and for urging said blade toward said shell in all cutting positions, means for supporting said shell only externally thereof so that the interior of said shell is maintained unrestricted, means for rotating said knife assembly and said shell relative to each other, and program drive means for advancing said assembly through a predetermined positively controlled non-linear path during relative rotation of said shell and knife assembly.

16. Apparatus for removing coconut meat from a coconut shell, comprising a knife assembly insertable into said shell for removing meat therefrom; said assembly including a slide member, blade structure on said slide member, and means for extending and retracting said slide member with said blade structure thereon relative to said shell in all cutting positions of said assembly; means mounting said knife assembly for pivotal movement into said shell so that said blade structure is arranged at generally right angles to said shell in all cutting positions, means for supporting said shell only externally thereof, means for rotating said knife assembly and said shell relative to each other, and program drive means for pivotally advancing said assembly through a predetermined curved path during relative rotation of said shell and knife assembly.

17. Apparatus for removing coconut meat from a coconut section in at least one well defined stream, comprising an apertured plate over which said coconut section is positionable in inverted condition with its open end down, means engageable only with the exterior of said coconut section for holding said coconut section on said plate and for rotating the same over said aperture therein, a knife assembly including a cutting blade pivotally mounted beneath said plate, and program means for actuating said knife assembly and for moving the same into said coconut section through said plate aperture in a predetermined positively controlled curved path; said knife assembly including means for slidably urging said cutting blade laterally of said assembly into contact with said meat in said coconut section while said assembly is moved through said curved path by said program means.

18. The apparatus of claim 17 in which said program means includes cam mechanism operatively connected with said knife assembly for positively advancing and retracting said assembly relative to said plate.

19. The apparatus of claim 17 which includes chute structure connected with said cutting blade and depending therefrom through which a stream of meat separated from said coconut section by said cutting blade passes.

20. The apparatus of claim 17 in which said knife assembly includes two spaced cutting blades each of which is adapted to remove a stream of meat from said coconut section, and chute structure aligned with said cutting blades for receiving the streams of meat cut by said blades and for maintaining said streams separate from each other.

21. The apparatus of claim 17 in which said knife assembly includes two spaced cutting blades each of which is adapted to remove a stream of meat from said coconut section, and chute structure for maintaining said streams of meat separate from each other following removal thereof by said cutting blades from said coconut section. said chute structure comprising a guide chute secured to said knife assembly in line with said cutting blades, said guide chute having two channels therein into which the streams of meat removed by said cutting blades are introduced.

22. The apparatus of claim 17 in which said knife assembly includes at least one cutting blade, and spacer means for maintaining said cutting blade spaced from the shell of said coconut section during cutting.

23. A knife assembly in an apparatus for removing meat from a nut, comprising a carrier, means for advancing and retracting said carrier relative to a reference location, and blade structure mounted on said carrier; said blade structure comprising a pair of cutting blades which extend in the same general direction as the axis of said carrier, each of said blades having an extension thereof angularly arranged relative thereto, said blade extensions diverging relative to each other rearwardly thereof.

24. The assembly of claim 23 including chute means postioned in line with each of said blades and its associated extension for receiving the separate streams of meat cut by said blades and extensions.

25. The assembly of claim 23 in which one of said blades and its associated extension are offset and advanced relative to the other blade and its associated extension.

26. A knife assembly in an apparatus for removing meat from a nut, comprising a carrier, means for advancing and retracting said carrier relative to a reference location, means mounting said carrier for pivotal movement about a fixed axis during advancement and retraction thereof, and blade structure mounted on said carrier; said blade structure comprising at least one cutting blade having a cutting edge thereon extending in the same general direction as the axis of said carrier, a cutting extension angularly arranged relative to said cutting blade, said cutting extension having a cutting edge thereon which is a substantial angular continuation of said blade cutting edge, and spacer means for maintaining the cutting edge of said extension spaced from the shell of said nut during meat removal.

27. A knife assembly in an apparatus for removing meat from a nut, comprising a carrier, constant pressure means for advancing and retracting said carrier relative to a reference location, means mounting said carrier for pivotal movement about a fixed axis, and knife structure on said carrier, said knife structure including a pair of cutting blades which extend in the same general direction as the axis of said carrier, each of said blades having a cutting extension projecting angularly therefrom, one of said blades and its associated extension being offset and advanced relative to the other blade and its associated extension.

28. Apparatus for removing coconut meat from a coconut section, comprising a bearing plate having an aperture therein on which a coconut section is positionable, selectively extensible and retractable pressure means for holding said coconut section on said plate and for rotating said coconut section over said aperture, a knife assembly pivotally mounted beneath said plate, and cam actuated program means for actuating said knife assembly and for pivotally moving the same into said coconut section through said plate aperture; said knife assembly including at least one cutting blade structure designed to remove a stream of meat from said coconut section, air pressure means for slidably urging said blade structure laterally of said assembly with generally constant pressure toward the shell of said coconut section while said assembly is pivotally moving in said section; said program means comprising a rotatable cam plate having a closed path cam groove in a face thereof, an actuating arm having a cam follower projecting therefrom into said cam groove, means connecting said arm with said assembly; and means for rotating said cam plate in timed relationship with rotation of said coconut section.

29. The apparatus of claim 28 in which said cam groove is designed, when said cam plate is rotated, to first pivotally advance said knife assembly a predetermined amount so that said blade structure projects only partially above said bearing plate into said coconut section, then to maintain said assembly stationary for a predetermined time, and then to progressively pivot said assembly upwardly to the top of said section.

30. The apparatus of claim 28 which includes chute structure connected with said blade structure and depending therefrom for receiving the stream of meat separated from said coconut section by said blade structure.

31. The apparatus of claim 28 which includes a pair of cutting blade structures each of which is designed to remove a stream of meat from said coconut section, and chute structure connected with said blade structures and depending therefrom for receiving the streams of meat separated from said coconut section by said blade structures and for retaining the same separate.

32. The apparatus of claim 16 in which said means for extending and retracting said slide member includes mechanism for urging said blade structure toward said shell with generally constant pressure in all cutting positions of said knife assembly.

33. The apparatus of claim 17 in which said means for holding said coconut section on said plate comprises three equally spaced extensible and retractable hold-down prong members which are engageable with the exterior of said coconut section.

34. A method of removing substantially all usable meat from a shell section comprising the steps of supporting a cup-shaped shell section only externally thereof for rotation so that the interior of said section is maintained unrestricted, rotating said shell section about its axis, as said shell section is rotating partially inserting a knife structure into said section without initially engaging the meat therein, thereafter moving said knife structure laterally into said meat, and during continued rotation of said shell section pivotally and progressively advancing said knife structure through a controlled predetermined non-straight path so that at least one generally helical cut of meat is removed from said shell section by said knife structure.

35. A knife assembly in an apparatus for removing meat from a nut, comprising a carrier, means for advancing and retracting said carrier relative to a reference location, and blade structure mounted on said carrier; said blade structure comprising at least one cutting blade extending in the same general direction as the axis of said carrier, a cutting extension angularly arranged relative to said cutting blade, and spacer means for maintaining the cutting edge of said extension spaced from the shell of said nut during meat removal, said spacer means comprising a relatively blunt projection extending beyond said cutting extension for engagement with said nut shell.

References Cited by the Examiner

UNITED STATES PATENTS

| | | | |
|---|---|---|---|
| 1,438,714 | 12/22 | Olds | 146—7 |
| 1,761,639 | 6/30 | Northcut | 30—279 |
| 2,633,883 | 4/53 | Hernandez et al. | 146—7 |
| 2,835,294 | 5/58 | Rigney | 146—52 |
| 2,897,861 | 8/59 | Leslie | 146—6 |

J. SPENCER OVERHOLSER, *Primary Examiner.*